(12) United States Patent
Eriksson et al.

(10) Patent No.: US 7,568,866 B2
(45) Date of Patent: Aug. 4, 2009

(54) CUTTING TOOL

(75) Inventors: Jan Eriksson, Fagersta (SE); Alena Nordqvist, Vasteras (SE)

(73) Assignee: Seco Tools AB, Fagersta (SE)

( * ) Notice: Subject to any disclaimer, the term of this patent is extended or adjusted under 35 U.S.C. 154(b) by 382 days.

(21) Appl. No.: 11/162,657

(22) Filed: Sep. 19, 2005

(65) Prior Publication Data
US 2006/0208556 A1 Sep. 21, 2006

(30) Foreign Application Priority Data
Oct. 5, 2004 (SE) .................................... 0402407

(51) Int. Cl.
*B23B 31/22* (2006.01)
*B23B 31/171* (2006.01)

(52) U.S. Cl. .................... 408/226; 408/240; 279/30; 279/71; 279/101; 279/905

(58) Field of Classification Search ............ 408/240, 408/226; 279/30, 76, 78, 101, 904, 905, 279/74, 75; *B23B 31/22, 31/171*
See application file for complete search history.

(56) References Cited

U.S. PATENT DOCUMENTS

| | | | | |
|---|---|---|---|---|
| 1,311,961 A | * | 8/1919 | Gairing | 279/22 |
| 1,433,527 A | * | 10/1922 | Browand | 279/81 |
| 1,475,136 A | | 11/1923 | Olson | |
| RE16,061 E | * | 5/1925 | Thurston | 175/320 |
| 2,491,605 A | * | 12/1949 | Chittenden | 279/82 |
| 2,618,940 A | * | 11/1952 | Wyzenbeek | 464/52 |
| 3,023,015 A | * | 2/1962 | Pankow | 279/14 |
| 3,094,338 A | | 6/1963 | Page | |
| 3,725,988 A | | 4/1973 | Sunderman et al. | |
| 3,735,993 A | * | 5/1973 | Seibert | 279/75 |
| 3,986,302 A | | 10/1976 | Biardi | |
| 4,053,252 A | | 10/1977 | Gersch | |

(Continued)

FOREIGN PATENT DOCUMENTS

EP 0294348 12/1988

(Continued)

OTHER PUBLICATIONS

Swedish Official Action from corresponding SE0402407 (including partial English translation).

(Continued)

*Primary Examiner*—Eric A Gates
(74) *Attorney, Agent, or Firm*—WRB-IP LLP

(57) ABSTRACT

The present invention relates to tools with replaceable tips and, more particularly, to arrangements for securing replaceable tips to tip holders. The tool includes a tip including a working end, a connecting end, and a radially extending abutment surface; a tip holder including a mating end for mating with the connecting end and a radially extending supporting surface for abutting against the abutment surface to limit axial movement of the tip relative to the tip holder. The connecting end is non-circular and includes a groove. The tool includes an assembly including the tip and the tip holder arranged such that, upon relative rotation of the tip and the tip holder in a connecting direction, an axial force is exerted on the groove and causes the abutment surface to move toward the supporting surface.

14 Claims, 7 Drawing Sheets

U.S. PATENT DOCUMENTS

| | | | |
|---|---|---|---|
| 4,167,083 A | 9/1979 | Soderberg | |
| 4,228,705 A * | 10/1980 | Heisner | 82/158 |
| 4,275,853 A | 6/1981 | Kreuz et al. | |
| 4,509,887 A | 4/1985 | Hofling | |
| 4,577,875 A * | 3/1986 | Miyakawa | 279/75 |
| 4,655,631 A | 4/1987 | Mitchell | |
| 4,808,049 A * | 2/1989 | Cook | 409/234 |
| 4,824,274 A | 4/1989 | von Haas | |
| 4,850,759 A * | 7/1989 | Strand et al. | 408/239 A |
| 5,011,344 A * | 4/1991 | Johnson | 408/240 |
| 5,062,749 A * | 11/1991 | Sheets | 279/75 |
| 5,152,642 A * | 10/1992 | Pitts et al. | 408/226 |
| RE34,256 E * | 5/1993 | Strand et al. | 408/239 A |
| 5,303,984 A | 4/1994 | Ojanen | |
| 5,542,792 A | 8/1996 | Krueger et al. | |
| 5,851,094 A * | 12/1998 | Strand et al. | 409/234 |
| 5,964,555 A * | 10/1999 | Strand | 409/234 |
| 6,494,648 B2 * | 12/2002 | Harpaz | 407/30 |
| 6,939,213 B2 * | 9/2005 | Lovchik et al. | 451/360 |
| 7,387,479 B1 * | 6/2008 | Lee | 409/232 |
| 2001/0009636 A1 | 7/2001 | Men | |
| 2003/0026669 A1 | 2/2003 | Lang et al. | |
| 2003/0164597 A1 | 9/2003 | Kimura et al. | |
| 2003/0178797 A1 * | 9/2003 | Lovchik et al. | 279/75 |
| 2003/0210963 A1 | 11/2003 | Kakai et al. | |
| 2006/0051174 A1 * | 3/2006 | Pantzar et al. | 409/234 |
| 2006/0257215 A1 * | 11/2006 | Kakai | 407/101 |

FOREIGN PATENT DOCUMENTS

| | | |
|---|---|---|
| EP | 0298937 | 1/1989 |
| EP | 0776719 | 6/1997 |
| EP | 0949030 | 10/1999 |
| EP | 1342521 | 9/2003 |
| EP | 1346787 | 9/2003 |

OTHER PUBLICATIONS

International Search Report from corresponding PCT/SE2005/001358.

* cited by examiner

CUTTING TOOL

The present invention relates to tools with replaceable tips and, more particularly, to arrangements for securing replaceable tips to tip holders.

It is often extremely important in operations such as machining of metal or other workpieces that the location of a cutting edge of a cutting tool be precisely controlled and controllable. Complex machinery is provided to mill, drill, bore, or otherwise perform shaping operations on workpieces by precisely controlling the location of a cutting tool relative to the workpiece. Cutting tools often include replaceable inserts or cutting heads that are attached to permanent toolholders such as shanks that are moved relative to the workpiece.

The accuracy of the mounting of the cutting inserts or heads relative to the toolholder is a factor in the accuracy of the operation to be performed on the workpiece. In the case, for example, of a rotating tool, an insert or tool head or tip that is displaced axially relative to a rotating shank to which it is attached can damage the workpiece and may necessitate the rejection of an expensive part. It is therefore desirable to accurately locate the working portion of the tool tip relative to the shank and to keep the tool tip securely held in place relative to the shank.

Also, in certain tools, the tool tip is fastened to the shank by gripping an external surface of the tool tip with another tool, such as a wrench. In other tools, the tool tip does not lend itself to being gripped by a wrench. It is desirable to provide an arrangement that does not require gripping of an exterior surface of a tool tip by a tool such as a wrench.

In accordance with an aspect of the present invention, a tool includes a tip including a working end, a connecting end, and a radially extending abutment surface. The tool also includes a tip holder including a mating end for mating with the connecting end and a radially extending supporting surface for abutting against the abutment surface to stop axial movement of the tip relative to the tip holder. The connecting end is non-circular and includes a groove, and the tool includes an assembly including the tip and the tip holder arranged such that, upon relative rotation of the tip and the tip holder in a connecting direction, an axial force is exerted on the groove and causes the abutment surface to move toward the supporting surface.

In accordance with another aspect of the present invention, a tool tip includes a working end, a connecting end, and a radially extending abutment surface facing away from the working end between the working end and the connecting end. The connecting end is non-circular and includes a groove, and the tool tip is arranged such that, upon relative rotation of the tip and a tip holder in a connecting direction, the groove is adapted to bear an axial force that causes the abutment surface to move toward a supporting surface of the tip holder.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figures 1A, 1B:
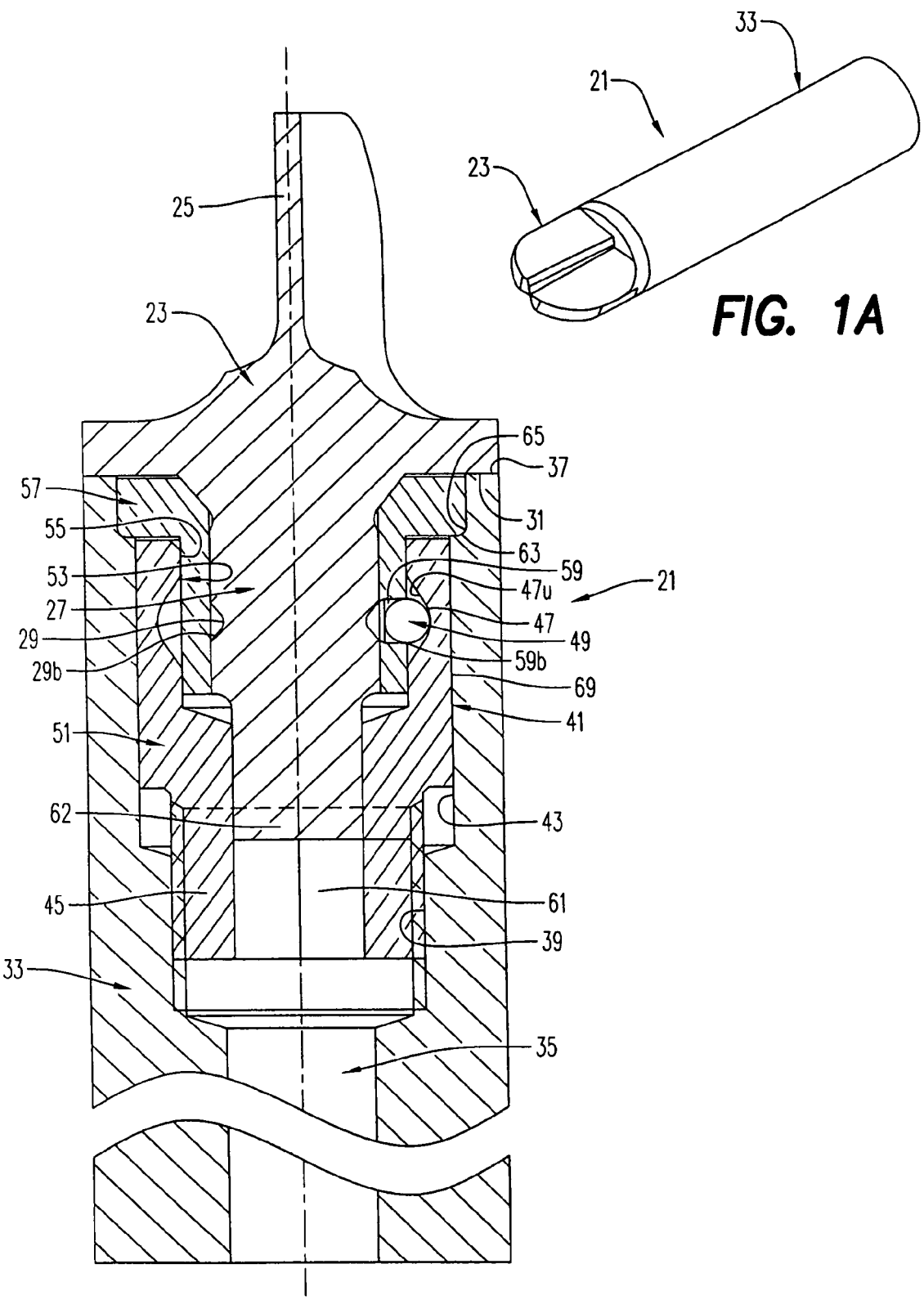
FIG. 1A is a perspective view and FIGS. 1B and 1C are side cross-sectional views of a tool according to an embodiment of the present invention.
Figure 1C:
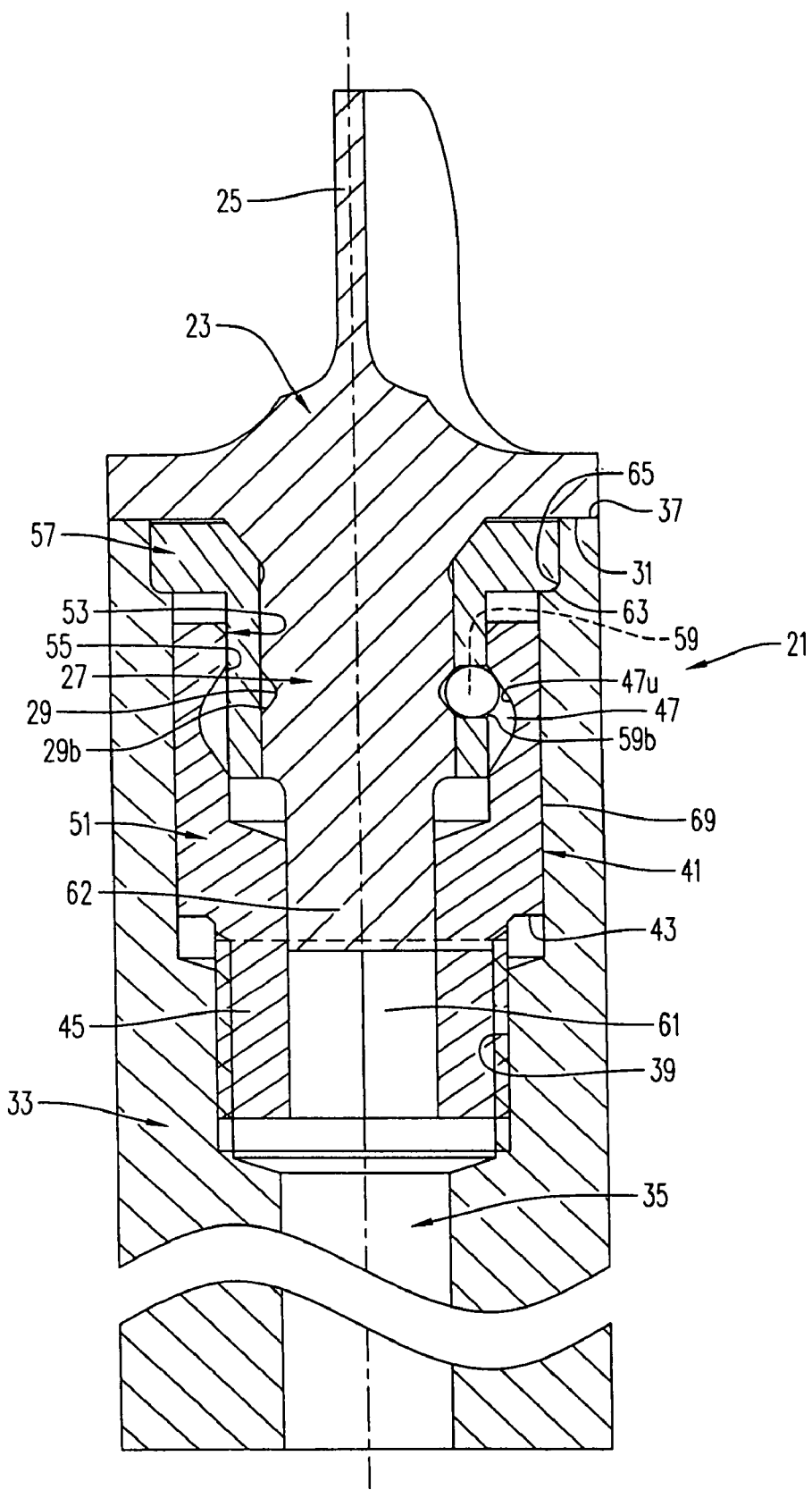
Figure 2:
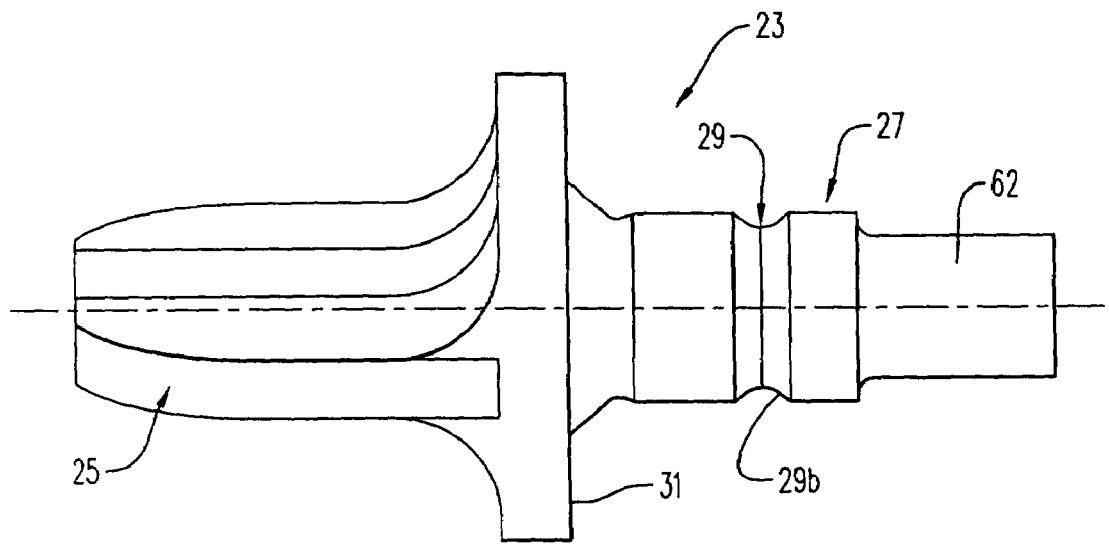
FIG. 2 is a side plan view of a cutting tip for the tool of FIGS. 1A-1C.

A tool 21 having a replaceable working portion according to an embodiment of the present invention is seen in FIGS. 1A-1C. The tool 21 is a cutting tool, although the present invention has applications in areas other than in cutting tools with replaceable working portions. The tool 21 can include a cutting tip 23 as seen in FIG. 2. The cutting tip 23 can include a working end 25 and a connecting end or shank end 27. The shank end 27 has an external groove 29 therein. The external groove 29 can be, but need not be, a circumferential groove extending around the entire circumference of the shank end 27. The cutting tip 23 also includes a radially extending abutment surface 31 facing away from the working end 25 between the working end and the shank end 27.

Figure 3:
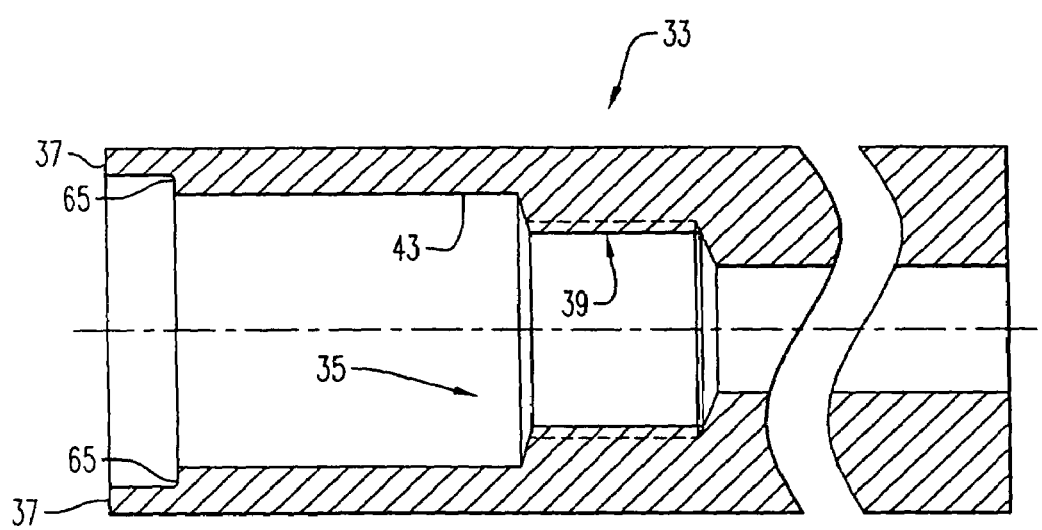
FIG. 3 is a side cross-sectional view of a cutting tip holder for the tool of FIGS. 1A-1C.

The tool 21 can also include a cutting tip holder 33 as seen in FIG. 3. The cutting tip holder 33 includes an internal axially extending opening 35 for receiving the shank end 27 and a radially extending supporting surface 37 for abutting against the abutment surface 31 of the cutting tip 23 to limit axial movement of the cutting tip relative to the cutting tip holder. The distance between the abutment surface 31 and the distal tip of the working end 25 is ordinarily precisely controlled to ensure that the cutting edge(s) of the working end are located where they are intended to be located. The internal axially extending opening 35 includes an internally threaded portion 39.

As seen in FIGS. 1B and 1C, the tool 21 can also include a sleeve arrangement 41 disposed between the shank end 27 and an internal surface 43 of the internal axially extending opening 35. The sleeve arrangement 41 includes an externally threaded member 45 adapted to engage the internally threaded portion 39 of the cutting tip holder 33. The sleeve arrangement 41 is adapted to engage the external groove 29 and move the cutting tip 23 such that the abutment surface 31 of the cutting tip moves toward the supporting surface 37 of the cutting tip holder 33 when the externally threaded member 45 is rotated relative to the cutting tip holder.

Figure 4B:
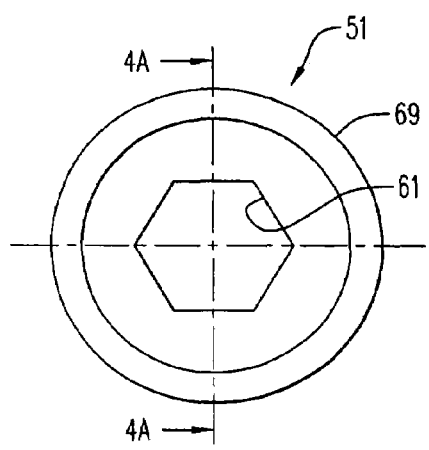
FIGS. 4A and 4B are side cross-sectional and bottom plan views of an outer sleeve portion for the tool of FIGS. 1A-1C.
Figure 4A:
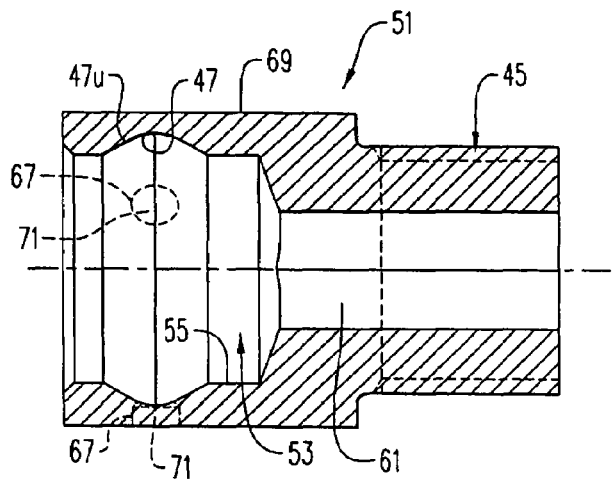
Figure 5B:
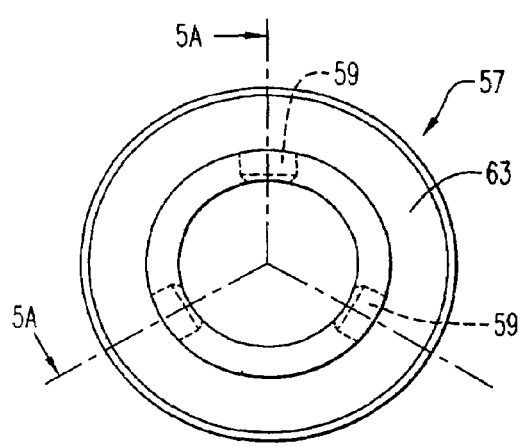
FIGS. 5A and 5B are side cross-sectional and bottom plan views of an inner sleeve portion for the tool of FIGS. 1A-1C.
Figure 5A:
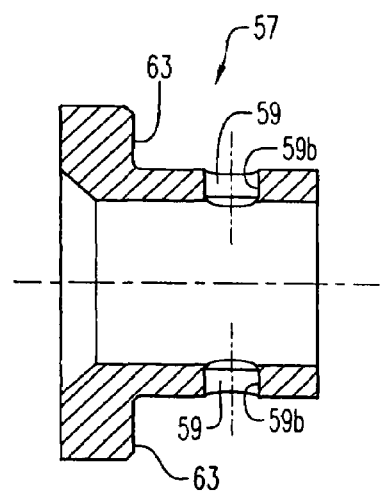

In the tool 21 shown in FIGS. 1B and 1C, the sleeve arrangement 41 can include an internal groove 47 and a force transmitting element 49 movably disposed in the internal groove and the external groove 29. The internal groove 47 can be, but need not be, a circumferential groove that extends around an entire internal circumference of the sleeve arrangement 41 or part of the sleeve arrangement. The sleeve arrangement 41 can include an outer sleeve portion 51 as seen in FIGS. 4A and 4B having a second internal axially extending opening 53 with an internal surface 55 in which the internal groove 47 is provided. The sleeve arrangement 41 can also include an inner sleeve portion 57 as seen in FIGS. 5A and 5B at least partially disposed inside the second internal axially extending opening 53 of the outer sleeve portion 51 as seen in FIG. 1B and having at least one radially extending opening 59 through which the force transmitting element 49 extends.

In the tool 21 of FIG. 1B, the externally threaded member 45 may be non-rotatably fixed to the outer sleeve portion 51 (FIG. 4A). The externally threaded member 45 may include a non-circular internal opening 61 (FIG. 4B). The shank end 27 of the cutting tip 23 may include a non-circular end 62 adapted to be received in the non-circular opening 61 so that the cutting tip 23 is axially movable but non-rotatable relative to the externally threaded member 45. If, as seen in FIG. 1B, the non-circular end 62 does not extend all the way through the non-circular opening 61, a suitable non-circular tool (not shown) such as a hexagonal Allen wrench (when the non-circular opening 61 is hexagonal) may be used to turn the externally threaded member 45 (and the outer sleeve portion 51 fixed thereto) relative to the cutting tip holder 33 by extending the non-circular tool through the internal axially extending opening 35 of the cutting tip holder. If, as seen in the embodiment described in connection with FIGS. 6 and 7, the non-circular end 162 does extend all the way through the non-circular opening 161, a suitable non-circular tool (not shown) such as a hexagonal socket wrench (when the non-circular end 162 is hexagonal) may be used to turn the externally threaded member 145 relative to the cutting tip holder 133 by extending the non-circular tool through the internal axially extending opening 135 of the cutting tip holder.

As seen in FIG. 1B, the inner sleeve portion 57 can include a radially extending second abutment surface 63 and the internal axially extending opening 35 of the cutting tip holder 33 can include a radially extending second supporting surface 65 against which the abutment surface 63 of the inner sleeve portion is adapted to abut when the axial abutment surface 31 of the cutting tip 23 is moved toward the supporting surface 39.

The force transmitting element 49 can be a ball, such as a ball bearing. Ordinarily, there will be a plurality of balls 49. To install the ball 49 in the external groove 29 of the cutting tip 23 and the internal groove 47 of the sleeve arrangement 41, the sleeve arrangement can include an opening 67 (shown in phantom in FIG. 4A) extending radially from an exterior axially extending surface 69 of the outer sleeve portion 51 to the internal groove 47 of the sleeve arrangement and through which the ball is adapted to pass. A plug member 71 (shown in phantom in FIG. 4A) such as a set screw can be provided for plugging the sleeve arrangement opening 67. To assemble the cutting tip 23 and the sleeve arrangement 41, the plug member 71 can be removed and the shank end 27 of the cutting tip can be inserted into the internal axially extending opening 35 of the cutting tip holder 33 until the external groove 29 and the internal groove 47 are substantially aligned. The ball(s) 49 can be inserted into the volume defined by the external groove 29 and the internal groove 47 through the radial opening 67 in the outer sleeve portion 51. The plug member 71 can then be reinstalled in the radial opening 67 so that the ball(s) 49 cannot fall out of the volume defined by the external groove 29 and the internal groove 47.

Once the force transmitting element(s) 49 are disposed in the internal groove 47 of the outer sleeve portion 51 of the sleeve arrangement 41, the radially extending opening(s) 59 in the inner sleeve portion 57, and the external groove 29 of the shank end 27 of the cutting tip 23, then relative axial movement of the cutting tip and the outer and inner sleeve portions is limited as a function of the size of the internal and external grooves and the force transmitting element(s). The force transmitting element(s) 49 can be held at desired angular orientations relative to one another in the radially extending opening(s) 59 in the inner sleeve portion 57. In this way, axial force transmission between the shank end 27 of the cutting tip 23 and the outer sleeve portion 51 can be distributed evenly around the external groove 29 and the internal groove 47.

The externally threaded member 45, together with the outer sleeve portion 51 to which it is attached as well as the inner sleeve portion 57 and the cutting tip 23 that are secured to the outer sleeve portion by the force transmitting element (s), is placed in the internal axially extending portion 39 of the internal axially extending opening 35 of the cutting tip holder. Threads on the externally threaded member 45 are caused to engage with the internally threaded portion 39 of the internal axially extending opening 35 of the cutting tip holder 33 and the externally threaded member is turned in a rotational direction opposite the direction in which the tool 21 is intended to rotate during operation so that threads of the externally threaded member engage threads of the internally threaded portion 39 to a desired extent. As the externally threaded member 45 is rotated relative to the internally threaded portion 39 and, therefore, moves downward relative to the cutting tip holder 33, the outer sleeve portion 51 moves downward and an upper portion 47u of the internal groove 47 contacts the force transmitting element(s) 49, see FIG. 1C. As the externally threaded member 45 is further rotated relative to the internally threaded portion 39, the force transmitting element(s) 49 contact the bottom portion(s) 59b of the radially extending opening through the inner sleeve portion 57 to cause the second abutment surface 63 to move toward the second supporting surface 65. As the externally threaded member 45 is further rotated relative to the internally threaded portion 39, the force transmitting element(s) 49 contact the bottom portion 29b of the external groove 29 which functions as an axial force bearing surface so that the abutment surface 31 of the cutting tip 23 moves toward the supporting surface 37 of the cutting tip holder 33. The cutting tip 23 will ordinarily be properly positioned relative to the cutting tip holder 33 when the second abutment surface 63 contacts the second supporting surface 65 and the abutment surface 31 contacts the supporting surface 37.

Figure 6:
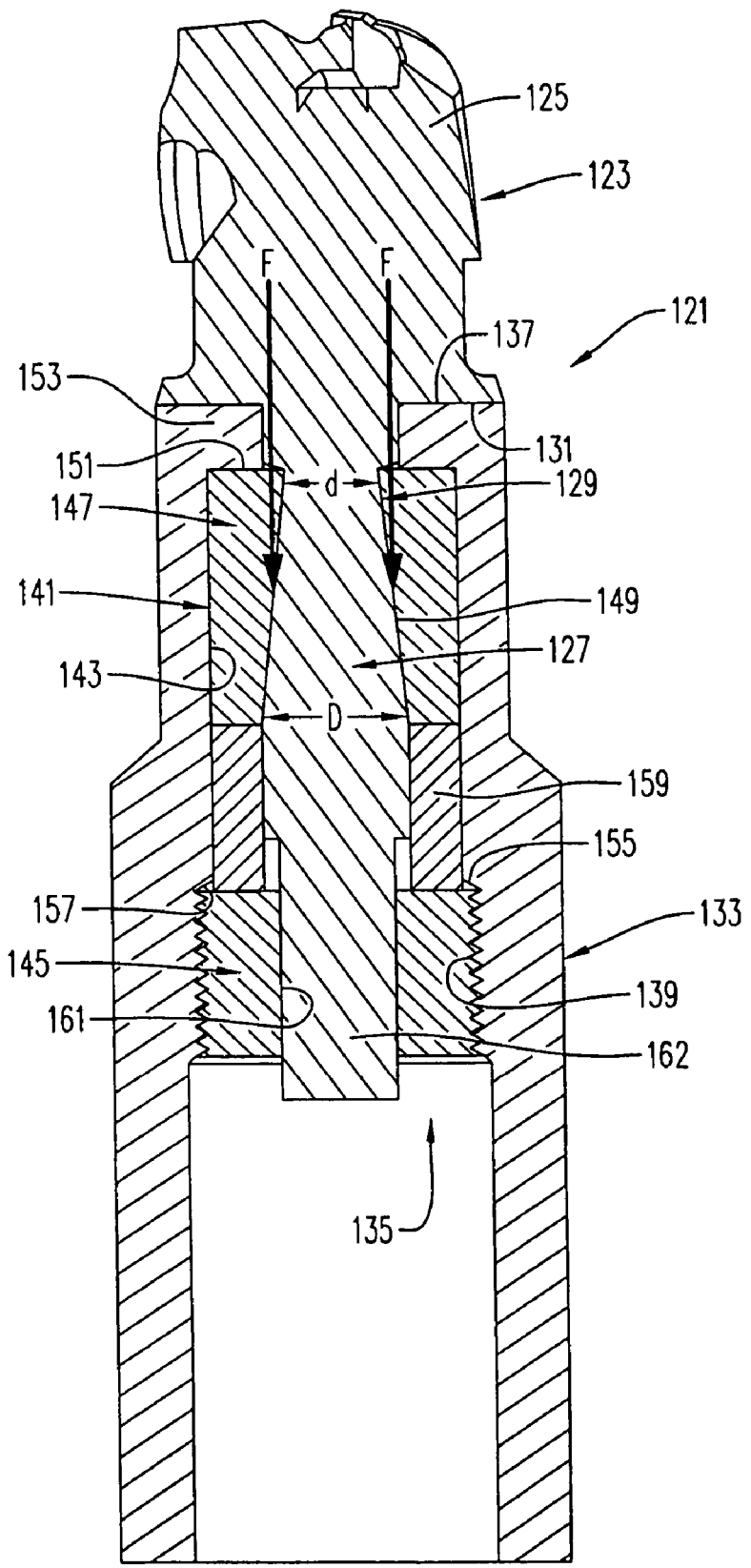
FIG. 6 is a side cross-sectional view of a tool according to another embodiment of the present invention.
Figure 7:
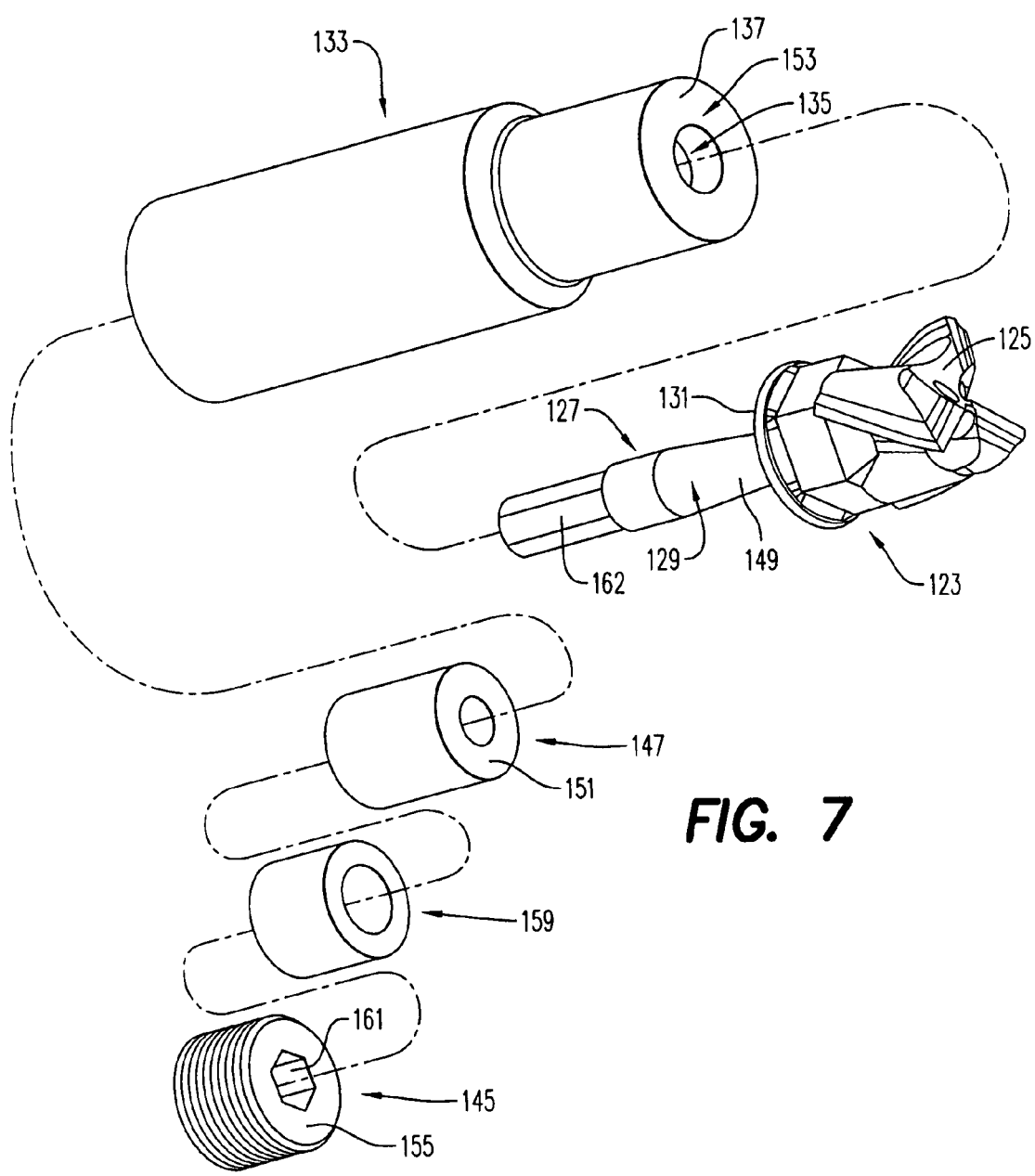
FIG. 7 is an exploded perspective view of the tool of FIG. 6.

FIGS. 6 and 7 show another embodiment of a tool 121 that can have a replaceable working portion. The tool 121 is a cutting tool, although the present invention has applications in areas other than in cutting tools with replaceable working portions. The tool 121 can include a cutting tip 123. The cutting tip 123 can include a working end 125 and a connecting end or shank end 127. The shank end 127 has an external groove 129 therein. The external groove 129 can be, but need not be, a circumferential groove extending around the entire circumference of the shank end 127. The cutting tip 123 also includes a radially extending abutment surface 131 between the working end 125 and the shank end 127.

The tool 121 can also include a cutting tip holder 133. The cutting tip holder 133 includes an internal axially extending opening 135 for receiving the shank end 127 and a radially extending supporting surface 137 for abutting against the abutment surface 131 of the cutting tip 123 to limit axial movement of the cutting tip relative to the cutting tip holder. The distance between the abutment surface 131 and the distal tip of the working end 125 is ordinarily precisely controlled to ensure that the cutting edge(s) of the working end are located where they are intended to be located. The internal axially extending opening 135 includes an internally threaded portion 139.

The tool 121 can also include a sleeve arrangement 141 disposed between the shank end 127 and an internal surface 143 of the internal axially extending opening 135. The sleeve arrangement 141 includes an externally threaded member 145 adapted to engage the internally threaded portion 139 of the cutting tip holder 133. The sleeve arrangement 141 is adapted to engage the external groove 129 and move the cutting tip 123 such that the abutment surface 131 of the cutting tip moves toward the supporting surface 137 of the cutting tip holder 133 when the externally threaded member 145 is rotated relative to the cutting tip holder.

The sleeve arrangement 141 includes a compressible sleeve portion 147 disposed between the internal surface 143 of the internal axially extending opening 135 of the cutting tip holder 133 and the external groove 129 of the cutting tip 123. The external groove 129 includes a frustoconical surface 149 having a smallest diameter d closer to the working end 125 of the cutting tip 123 than a largest diameter D. An upper end 151 of the compressible sleeve portion 147 is bounded by a radially extending flange portion 153 of the cutting tip holder 133. Rotation of the externally threaded member 145 in a direction opposite to a direction of rotation of the tool 121 during operation compresses the compressible sleeve portion 147 against the frustoconical surface 149 of the external groove 129 of the cutting tip 123 such that a force F in an axial direction is applied to the frustoconical surface which functions as an axial force bearing surface.

The externally threaded member 145 can include a second radially extending abutment surface 155 and the internal axially extending opening 135 of the cutting tip holder 133 can include a second radially extending supporting surface 157 for abutting the second radially extending abutment surface and preventing further compression of the compressible sleeve portion 147.

The sleeve arrangement 141 may also include a sleeve portion 159 disposed around part of the shank end 127 and disposed axially between the compressible sleeve portion 147 and the externally threaded member 145. The sleeve portion 159 may be incompressible or compressible.

The compressible sleeve portion 147 can be any suitable compressible material. The compressible material may include an elastomeric material. The compressible material may be a bag including a non-sticking material such as TEFLON and having a plurality of balls or pellets of compressible or incompressible material disposed inside of the bag.

Figure 8:
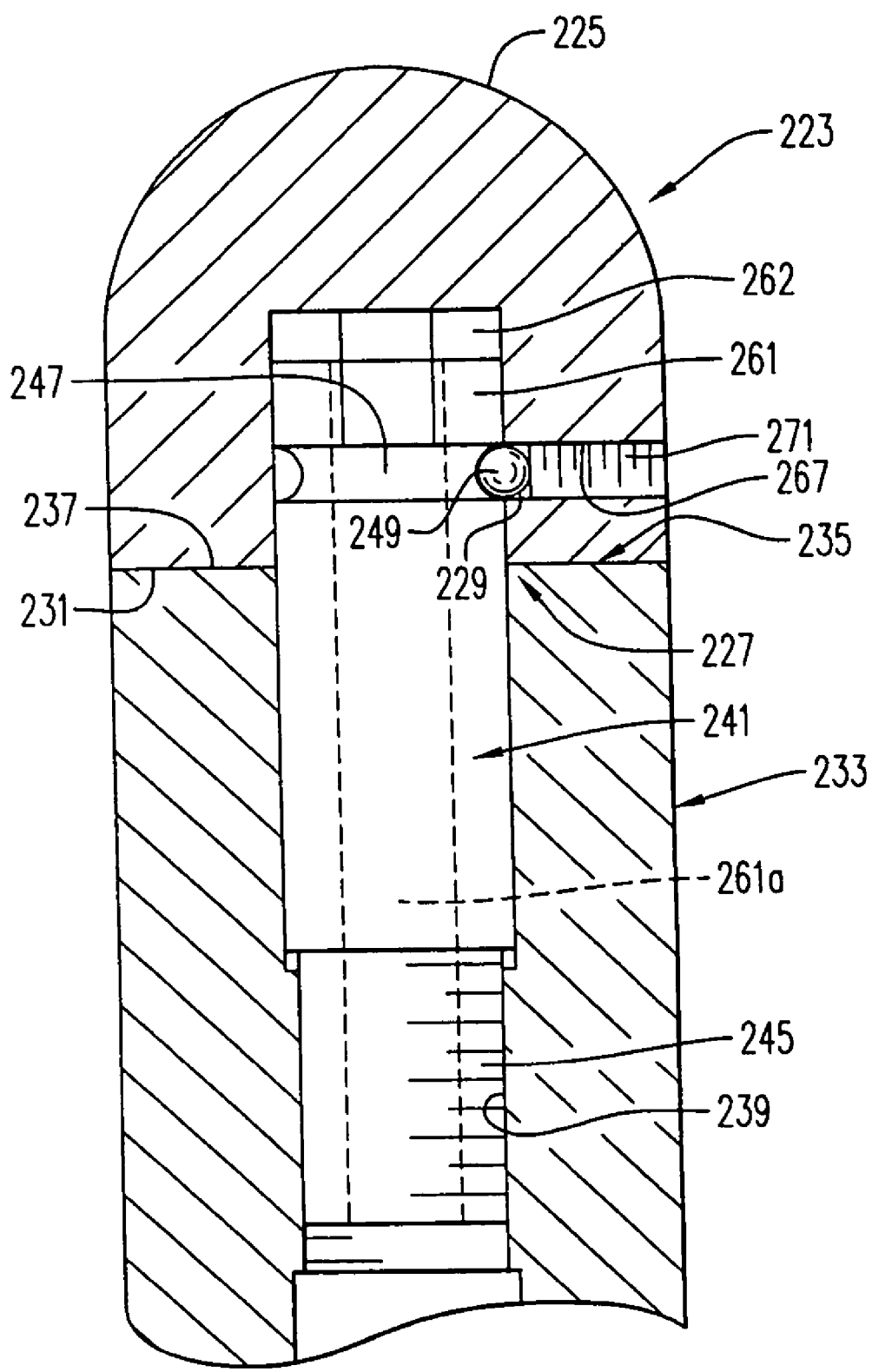
FIG. 8 is a side cross-sectional view of a tool according to another embodiment of the present invention.

Thus far, embodiments have been described wherein a male connecting or shank end of a tool tip is received in a female mating end or opening of a tip holder. The invention is not limited to such embodiments, which are merely illustrative. For example, FIG. 8 shows another embodiment wherein a tip holder 233 has a mating end 235 that is adapted to be received in a female connecting end 227 of a tip 223 with a working end 225. In the embodiment of FIG. 8, the mating end 235 of the tip holder 233 can include a connecting rod 241 that can have an external groove 247 proximate one end and an externally threaded portion 245 proximate another end. The rod 241 can also have a non-circular opening 261a for receiving a tool for turning the rod. The tip holder 233 can have an axially extending opening that can have an internally threaded portion 239 for mating with the externally threaded portion 245 of the connecting rod 241. The connecting end 227 of the tip 223 can be provided with one or more radial openings 267 that can be closed with, e.g., a plug 271 to define a groove 229 to retain a member such as a ball 249 that can be partially received in the external groove 247 of the connecting rod 241. The mating end 227 can include a non-circular internal opening portion 262 that receives a non-circular external portion 261 of the connecting rod 241 such that the tip 223 is non-rotatable relative to the connecting rod.

When the connecting rod 241 is turned in a retaining direction relative to the tip holder 233 by a tool received in the non-circular opening 261a, the external groove 247 on the connecting rod moves toward the tip holder. The ball 249 contacts the top of the external groove 247 and the bottom of the groove 229 so that the tip 223 is drawn toward the tip holder 233 until an abutment surface 231 on the tip contacts a supporting surface 237 on the tip holder.

It should be noted that in all described embodiments according to the present invention the tip can alternatively be gripped by a tool such as a wrench to secure the tip to the tip holder by means of relative rotation.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A tool, comprising:
    a tip including a working end, a connecting end, and a radially extending abutment surface;
    a tip holder including a mating end for mating with the connecting end and a radially extending supporting surface for abutting against the abutment surface to limit axial movement of the tip relative to the tip holder, and
    wherein the connecting end is non-circular and includes a groove and wherein the tool includes an assembly including the tip and the tip holder arranged such that, upon relative rotation of the tip and the tip holder in a connecting direction, an axial force is exerted on the groove and causes the abutment surface to move toward the supporting surface,
    wherein the connecting end is a shank end and wherein the tip holder comprises an internal axially extending opening for receiving the shank end and wherein the shank end has an external groove therein, wherein the internal axially extending opening includes an internally threaded portion, and wherein the tool includes a sleeve arrangement disposed between the shank end and an internal surface of the internal axially extending opening, the sleeve arrangement including an externally threaded member adapted to engage the internally threaded portion, the sleeve arrangement being adapted to engage the external groove and, at least in part, move axially relative to the tip, and move the tip relative to the tip holder such that the abutment surface moves toward the supporting surface when the externally threaded member is rotated relative to the tip holder.

2. The tool as set forth in claim 1, wherein the sleeve arrangement includes an internal groove and a force transmitting element movably disposed in the internal groove and the external groove and the externally threaded member is non-rotatably fixed to the sleeve arrangement.

3. The tool as set forth in claim 2 wherein the sleeve arrangement includes an outer sleeve portion having a second internal axially extending opening with an internal surface in which the internal groove is provided and an inner sleeve portion at least partially disposed inside the second internal axially extending opening and having at least one radially extending opening through which the force transmitting element extends.

4. The tool as set forth in claim 3, wherein the externally threaded member includes a non-circular internal opening.

5. The tool as set forth in claim 1, wherein the externally threaded member is non-rotatably fixed to an outer sleeve portion of the sleeve arrangement.

6. The tool as set forth in claim 5, wherein the externally threaded member includes a non-circular internal opening.

7. The tool as set forth in claim 1, wherein the externally threaded member includes a non-circular internal opening.

8. The tool as set forth in claim 1, wherein the sleeve arrangement includes a compressible sleeve portion disposed between the internal surface of the internal axially extending opening and the external groove.

9. The tool as set forth in claim 8, wherein the external groove includes a frustoconical surface having a smallest diameter closer to the working end than a largest diameter of the frustoconical surface.

10. The tool as set forth in claim 1, wherein the external groove includes a frustoconical surface having a smallest diameter closer to the working end than a largest diameter of the frustoconical surface.

11. A tool, comprising:
a tip including a working end, a connecting end, and a radially extending abutment surface;
a tip holder including a mating end for mating with the connecting end and a radially extending supporting surface for abutting against the abutment surface to limit axial movement of the tip relative to the tip holder, and
wherein the connecting end is non-circular and includes a groove and wherein the tool includes an assembly including the tip and the tip holder arranged such that, upon relative rotation of the tip and the tip holder in a connecting direction, an axial force is exerted on the groove and causes the abutment surface to move toward the supporting surface, the connecting end is a shank end and wherein the tip holder comprises an internal axially extending opening for receiving the shank end and wherein the shank end has an external groove therein, wherein the internal axially extending opening includes an internally threaded portion, wherein the tool includes a sleeve arrangement disposed between the shank end and an internal surface of the internal axially extending opening, the sleeve arrangement including an externally threaded member adapted to engage the internally threaded portion, the sleeve arrangement being adapted to engage the external groove and, at least in part, move relative to the tip, and move the tip relative to the tip holder such that the abutment surface moves toward the supporting surface when the externally threaded member is rotated relative to the tip holder, the sleeve arrangement includes a compressible sleeve portion disposed between the internal surface of the internal axially extending opening and the external groove, the external groove includes a frustoconical surface having a smallest diameter closer to the working end than a largest diameter of the frustoconical surface, and rotation of the externally threaded member in a direction opposite to a direction of rotation of the tool during operation compresses the compressible sleeve portion such that a force in an axial direction is applied to the frustoconical surface.

12. A tool tip comprising:
a working end;
a connecting end; and
a radially extending abutment surface facing away from the working end between the working end and the connecting end;
wherein a first portion of the connecting end is non-circular and a second portion of the connecting end is circular and includes a groove extending around an entire periphery of the connecting end, wherein the groove comprises an inwardly extending top portion closest to the abutment surface and an outwardly extending bottom portion further from the abutment surface and forming a major portion of the groove.

13. The tool tip as set forth in claim 12, wherein the connecting end is a shank end and wherein the shank end has an external groove therein, the external groove forming an axial force bearing surface for bearing an axial force for securing the tool tip relative to the tip holder such that the abutment surface abuts a radially extending supporting surface of the tip holder.

14. The tool tip as set forth in claim 12, wherein the outwardly extending bottom portion defines a substantially constant angle with a longitudinal axis of the tip.

* * * * *